United States Patent

[11] 3,629,728

| [72] | Inventor | Billy W. Whitlow<br>Orange County, Fla. |
|---|---|---|
| [21] | Appl. No. | 356,147 |
| [22] | Filed | Mar. 31, 1964 |
| [45] | Patented | Dec. 21, 1971 |
| [73] | Assignee | Martin-Marietta Corporation<br>Middle River, Md. |

[54] A PULSE SELECTION SYSTEM USING PULSE POSITION TO PULSE AMPLITUDE CONVERSION
5 Claims, 12 Drawing Figs.

[52] U.S. Cl. .................................................. 332/1,
178/69.5, 325/323, 328/115, 328/179, 328/189,
329/1, 329/105, 340/147
[51] Int. Cl. ...................................................... H03k 7/00
[50] Field of Search .......................................... 178/69.5;
325/323, 322; 329/107, 102, 105; 340/147;
179/15 AB; 328/108, 109, 115–117, 165, 186, 41,
179, 187–189; 332/1

[56] References Cited
UNITED STATES PATENTS

| 2,468,058 | 4/1949 | Grieg | 328/165 X |
| 2,517,579 | 8/1950 | Levy | 329/107 X |
| 2,627,575 | 2/1953 | Meachum et al. | 307/88.5 |
| 3,142,806 | 7/1964 | Fernandez | 329/107 |
| 3,153,196 | 10/1964 | McGuire | 179/15 AB |

*Primary Examiner*—Alfred L. Brody
*Attorneys*—Michael A. Sileo, Jr., Julian C. Renfro and Gay Chin

ABSTRACT: This invention pertains to a pulse selector for demodulating pulse position modulated signals, involving means for converting all incoming pulses received during the first half cycle of a time frame into amplitude modulated pulses of one polarity, and all pulses received during the last half cycle of the time frame to the opposite polarity, such means being used in conjunction with selecting means for selecting from each set of amplitude modulated pulses, the pulse which is closest in amplitude to zero volts. A pulse containing intelligence is thus separated from noise and interference pulses based upon the likelihood that the pulse nearest the center of a given sample period is the intelligence pulse.

SUMMATION NETWORK

FIG 7

INVENTOR
BILLY W WHITLOW
BY Michael O. Sleaf
ATTORNEY

A PULSE SELECTION SYSTEM USING PULSE POSITION TO PULSE AMPLITUDE CONVERSION

This invention relates to a pulse selector for demodulating pulse position modulated signals in which both commissive and omissive errors may exist, and more particularly to a technique for demodulating a position modulated pulse train in which both intelligence and noise pulses of equal amplitude may appear, my system being advantageously capable of a high quality performance by virtue of a novel technique for selecting as the intelligence pulse during any one sample period, that pulse which is closest in position to the center of such sample period in preference to all other pulses occurring during that same period.

In many of the most recently developed commercial and military communication systems, pulse techniques for voice transmission are employed. Pulse-type communication systems which transmit modulated pulses are often preferable in lieu of the many well-known amplitude or frequency modulated carrier wave communication systems since they (1) require considerably less transmitter power, (2) are easily adaptable to handle digital data, and (3) provide plural message transmission with frequency-time sharing, yet require a relatively narrow bandwidth with respect to the number of messages sharing the frequency spectrum. Insofar as military communication systems are concerned, pulse modulation techniques are highly desirable since they are easily adaptable to encryption for security purposes.

One well-known pulse-type communication system utilizes the position of a pulse within definable time periods as the modulation technique. This type of modulation is commonly called pulse position modulation (PPM) and is attractive in that it has a considerably small line pulse rate or pulse density. Basically, in PPM systems, a varying signal, such as an audio signal, is periodically sampled and the voltage value of the varying signal during each periodic sample is caused to vary the time position of a pulse within a finite time period. For purposes herein, the rate in which the varying signal is sampled shall be referred to as the sample frequency; the time between samples shall be referred to as the sample period; and the finite time period in which a pulse is positioned relative to the voltage value of the varying signal during instantaneous sampling shall be referred to as the deviation period, which conventionally is equal to or less than the sample period.

In PPM-type communication systems, by appropriately synchronizing the transmitter and the receiver, any pulse received during the deviation period is detected and accepted for decoding or demodulating, whereas any pulse received outside the deviation period id disregarded or rejected. Clearly, by narrowing the deviation period with respect to the sample period, noise rejection may be greatly improved. However, other circuit parameters and requirements establish minimum limits upon the deviation period. By way of example, in a PPM communication system having a 9.6 kc. sampling frequency and a 104 microsecond sample period, the minimum allowable deviation period has been determined to be 35 microseconds. Under these conditions, the receiver will reject all pulses, which advantageously includes noise pulses, occurring during approximately two-thirds of the sample period, while any pulse of proper width and amplitude will be detected and accepted for decoding during the remaining one-third of the sample period.

Under ideal conditions only one pulse will be present as the intelligence pulse during any one deviation period. However, practical experience shows that ideal conditions do not occur as frequently as would be necessary to provide high-quality reproduction of the intelligence transmitted since some noise pulses are invariably involved.

There are primarily three undesirable conditions which degrade the quality of voice reproduction due to either the selection of the wrong pulse as the intelligence pulse by the receivers decoding circuits, or to the absence of a pulse during any sample period. First, there is the "omissive error" condition wherein no pulses, not even noise pulses, occur during the deviation period of the sample period; second, there is the "commissive error" condition wherein more than one pulse occurs during such deviation period; and third, there is the "omissive-commissive error" condition wherein the intelligence pulse is not present but interference pulses of sufficient width and amplitude are present during such deviation period.

In most prior known PPM communication systems, little consideration was given to the foregoing three undesirable conditions except to reduce the deviation period to a minimum. Although a very narrow deviation period considerably eliminates interference problems and greatly improves intelligence pulse selection, interference pulses (commissive errors) still occur during the narrow deviation period, and intelligence pulses are still lost (omissive errors) between modulation at the transmitter and demodulation at the receiver.

Although the prior art is replete with noise reduction circuits, few of these circuits are applicable for use in PPM systems. One known noise reduction circuit, however, which is applicable for use in PPM systems, utilizes a sine wave generator for varying the sensitivity of the PPM receiver so that its sensitivity will be normal during the deviation period but considerably reduced during time periods outside of the deviation period. This type of circuit arrangement is useful to prevent some of the interference signals from passing to the audio circuits of the system, but it does not provide adequate omissive or commissive error reduction.

The present invention is primarily directed toward a novel technique for reducing the effects of omissive or commissive errors in a PPM communication system. Basically, this novel technique advantageously utilizes the statistical properties of speech to uniquely increase the signal-to-noise ratio at the PPM receiver. That is to say, statistical surveys have determined that in a PPM communication system which is conveying unprocessed speech information containing random commissive and omissive errors, a signal-to-noise ratio improvement of several decibels is obtainable by selecting from the plurality of pulses occurring during any one sample period, the pulse which is closest in position to the center of such sample period. This "center-pulse" selection technique, therefore, applies the principle, in light of the statistical properties of speech and noise, that it is mathematically most probable that when more than one pulse is received during a particular sample period, the pulse most likely to be the intelligence pulse is the one closest to the center of such sample period. An extensive analysis of the statistical properties of speech and noise has indicated that the foregoing "center-pulse" selection technique uniquely reduces the effect of commissive errors by substantially 80 percent.

In accordance with the present invention, all pulses received during any one sample period are gated to a PPM detector which converts each of these PPM pulses into amplitude modulated pulses (PAM) by the conventional utilization of a sampler and a ramp wave generator. The PPm detector is preferably designed so that the PPM pulses occurring during the first half of each sample period are converted into PAM pulses of one polarity, such as a negative voltage; whereas the PPM pulses occurring during the latter half of each sample period are converted into PAM pulses of the opposite polarity, such as a positive voltage, with the center of the ramp wave being substantially at zero volts.

When the first negative PAM pulse is received, it is coupled via a negative gate circuit to a first memory circuit. If, per chance, other negative PAM pulses occur during that same sample period, it is apparent that the last negative PAM pulse must necessarily be closer to the center of that sample period than all previously occurring negative PAM pulses. Gating means are accordingly provided so that such second negative PAM pulse is first utilized to clear the first memory circuit, and then appropriately stored therein. This clearing of and storage in the first memory circuit is repeated for each subsequently occurring negative PAM pulse. Thus, during the first half of each sample period, the last-occurring negative PAM pulse will be stored in the first memory circuit.

When, however, the first positive PAM pulse occurs during the latter half of this same sample period, it is necessary for the pulse selector to decide whether or not this first-occurring positive PAM pulse is closer to the center of this sample period than the last occurring negative PAM pulse. It is, therefore, necessary to provide circuit means for advantageously selecting and uniquely utilizing only the positive PAM pulse which has an absolute voltage level less than the last-occurring negative PAM pulse stored in the first memory circuit, which of course would always be the first-occurring positive PAM pulse to occur, if at all. This is so since the absolute voltage levels of the PAM pulses relative to their positions from the beginning to the end of each sample period traverse an absolute voltage level spectrum from maximum value, through zero, to maximum value, with the zero point being substantially the center of the sample period. Thus, the last-occurring negative PAM pulse will always have a lower voltage level than any previously occurring negative PAM pulse, whereas the first-occurring positive PAM pulse will always have a lower voltage level than any subsequently occurring positive PAM pulse. Therefore, the PAM pulse, whether negative or positive in polarity, which is closest to the center of the sample period will have a lower absolute voltage level than any other PAM pulse occurring during that same sample period, and it is this pulse that is to be selected and utilized as the intelligence transmitted during this particular sample period.

The selection and utilization of the first-occurring positive PAM pulse in lieu of the last-occurring negative PAM pulse is accomplished in the present invention by providing a comparison circuit for sensing the condition in which the absolute voltage level of the ramp wave developed by the ramp wave generator exceeds the absolute voltage level of the last negative PAM pulse, and for developing a gating voltage relative to this condition. Clearly, when the absolute voltage level of the ramp wave exceeds the absolute voltage level of the last-occurring negative PAM pulse, all subsequently occurring positive PAM pulse will have an absolute voltage level greater than the absolute voltage level of the last-occurring negative PAM pulse and must necessarily be farther from the center of the sample period than such last-occurring negative PAM pulse.

A positive gate circuit is then provided for coupling all positive PAM pulses to an AND gate, which AND gate is appropriately controlled by the gating voltage developed by the comparison circuit. That is to say, when the absolute voltage level of the ramp wave is less than the absolute voltage level of the last occurring negative PAM pulse, the comparison circuit develops a gating voltage which enables the AND gate and permits the first positive PAM pulse to pass to a second memory circuit. Circuit means are also provided for developing both a reset voltage for clearing the first memory circuit and a gate inhibiting voltage for preventing the AND gate from passing any subsequently occurring positive PAM pulses to the second memory circuit. In other words, the first-occurring positive PAM pulse is utilized to develop a reset voltage for clearing the first memory circuit when the absolute voltage level of the ramp wave is less than the absolute voltage level of the last-occurring negative PAM pulse, and utilized to develop an inhibiting voltage for closing the AND gate a finite interval after the occurrence of such first positive PAM pulse and holding this gate closed until the end of that particular sample period. Of course, as stated earlier, should such first positive PAM pulse occur after the absolute voltage level of the ramp wave exceeds the absolute voltage level of the last negative PAM pulse, such AND gate will be inhibited by the gating voltage developed by the comparison circuit, and thereby preventing even the first-occurring positive PAM pulse from being stored in the second memory circuit.

The voltage level stored in either the first or second memory circuits is then coupled through appropriate filter circuits to the audio output circuits of the PPM receiver at the end of this particular sample period, thus to utilize as the intelligence during this particular sample period, a pulse having a high probability of being the correct one.

It will be apparent here that the present invention uniquely stores only the last negative PAM pulse to occur, and then decides whether or not this stored negative PAM pulse is closer to the center of that particular sample period than the first positive PAM pulse to occur. Also, the present invention is provided with gating means to insure that when only one PPM pulse is received, it is utilized as the intelligence pulse for that particular sample period. Additionally, the present invention provides an output memory circuit which is not discharged or cleared at the end of each sample period so that when no PPM pulses are received, not even noise pulses, the voltage information coupled to the output circuits of the PPM receiver during the immediately previous sample period is utilized as the intelligence transmitted during this particular subsequent sample period.

It is accordingly one object of the present invention to provide a novel pulse selecting system.

Another object of the present invention is to provide a novel pulse position demodulator.

Another object of the present invention is to provide a pulse selecting system which is capable of receiving a plurality of pulses during any one sample period, and to select as the intelligence pulse, the pulse most centrally positioned within the plurality of received pulses in preference to all other pulses.

Another object of the present invention is to provide a pulse selecting system which is capable of receiving both position modulated pulses and randomly occurring noise pulses in spaced time frames, and accurately selecting the pulse most centrally positioned within that time frame in preference to any other pulse occurring during the same time frame.

Another object of the present invention is to provide a pulse selecting system which is capable of receiving position modulated pulses and randomly occurring noise pulses in spaced time frames, and is capable of accurately selecting from the plurality of pulses occurring during any one of such time frames, the pulse which is closest in position to the center of such time frames.

Another object of the present invention is to provide a pulse selecting system which is capable of receiving position modulated pulses and randomly occurring interference pulses of equal amplitude in spaced time frames, which system utilizes gating circuits and memory circuits for selecting and storing the pulse which is closest in position to the center of that time frame, whereby such stored pulse is uniquely utilized as the intelligence pulse.

These and further objects and advantages of the present invention will become more apparent upon reference to the following description and claims and the appended drawings wherein:

While the present invention is directed to a pulse selecting system having general applicability, it is primarily applicable to a cochannel pulse-type communication system of the person-to-person type. Systems of this type may involve a large group of basic subscriber units having intermittent requirements for communication between other pairs of basic subscriber units and such systems utilize conventional telephone equipment without requiring well-known wire communication links or central telephone exchanges.

The transmitter and receiver combinations used by each basic subscriber unit of this type of cochannel system may conventionally operate upon the same three frequencies, such as 140, 141 and 142 megacycles. Each subscriber's voice is preferably sampled at a sample frequency of approximately 8,000 samples per second so as to obtain a sufficient number of amplitude samples. The sampled voice signals are then converted by conventional pulse modulating techniques to a series of pulses whose positions high-frequency the intelligence to be transmitted. The sampling frequency dictates the sample period or time frame which may be, for example, 125 microseconds long, with the position of the pulse within the deviation period representing the intelligence to be transmitted. The pulse width of the intelligence pulses to be transmitted may be, for example, 1-20 microseconds wide; whereas the deviation period may be, for example 50 microseconds long.

In accordance with a cochannel communication system of the aforementioned type, each position modulated pulse is converted into three pulses by delay line techniques. The three pulses are then coded, as a result of a user's manipulation of the delay lines on the transmitter portion of his basic subscriber unit, into a pulse assembly that will be recognized only by the user of the basic subscriber unit being called. Each receiver portion of each basic subscriber unit is correspondingly equipped with delay lines which result in that basic subscriber unit being capable of receiving only those pulse combinations intended for that unit. There is by necessity in communication systems of this type an advantageous amount of time sharing of the frequency spectrum; whereas the utilization of relatively narrow pulses necessitates the employment of considerably broad band techniques.

Since there are a large number of pulse combinations on the three basic frequencies, a large number of simultaneous conversations between basic subscriber units within the same geographical area may take place. The number of simultaneous conversations may be increased until the pulse density becomes so great as to result in unwanted crosstalk representing interference between conversing pairs of basic subscriber units. It is toward the reduction of the undesirable effects of crosstalk and other interference conditions that the present invention is directed. For a more detailed description of a preferred embodiment of the aforementioned cochannel pulse type communication system, reference may be made to the assignee's copending application, Ser. No. 107,194 filed May 2, 1961 in the name of McKay Goode for a DISCRETE ADDRESS COMMUNICATION SYSTEM WITH RANDOM ACCESS CAPABILITY, now U.S. Pat. No. 3,239,761 issued Mar. 8, 1966.

For purposes of simplicity and clarity the pulse selecting system described hereinafter utilizes a PPM to PAM converter (detector) having a ramp generator for developing a linear ramp wave which sweeps over a voltage range from $-V$ volts through zero, to $+V$ volts, and includes a negative and positive gate for respectively passing the negative and positive PAM pulses to independent subsequent circuitry. It is to be understood, of course, that a ramp generator which develops a linear wave that sweeps over other voltage ranges may be utilized without departing from the spirit and scope of the present invention. A prime requirement in this respect, however, is the incorporation of comparison and sensing means for determining the voltage level at the center of the ramp wave. By this means, all PAM pulses below the center voltage may be gated and processed in the same manner as above described with regard to the negative PAM pulses; whereas all PAM pulses above such center voltage may be gated and processed in the same manner as above described respecting the positive PAM pulses. By way of example, such comparison and sensing means may include a comparison circuit which compares the ramp wave developed by the ramp generator with a predetermined DC bias voltage, whereupon a high or low trigger voltage will be generated depending upon the voltage difference between the ramp wave and the DC bias.

Figure 1:
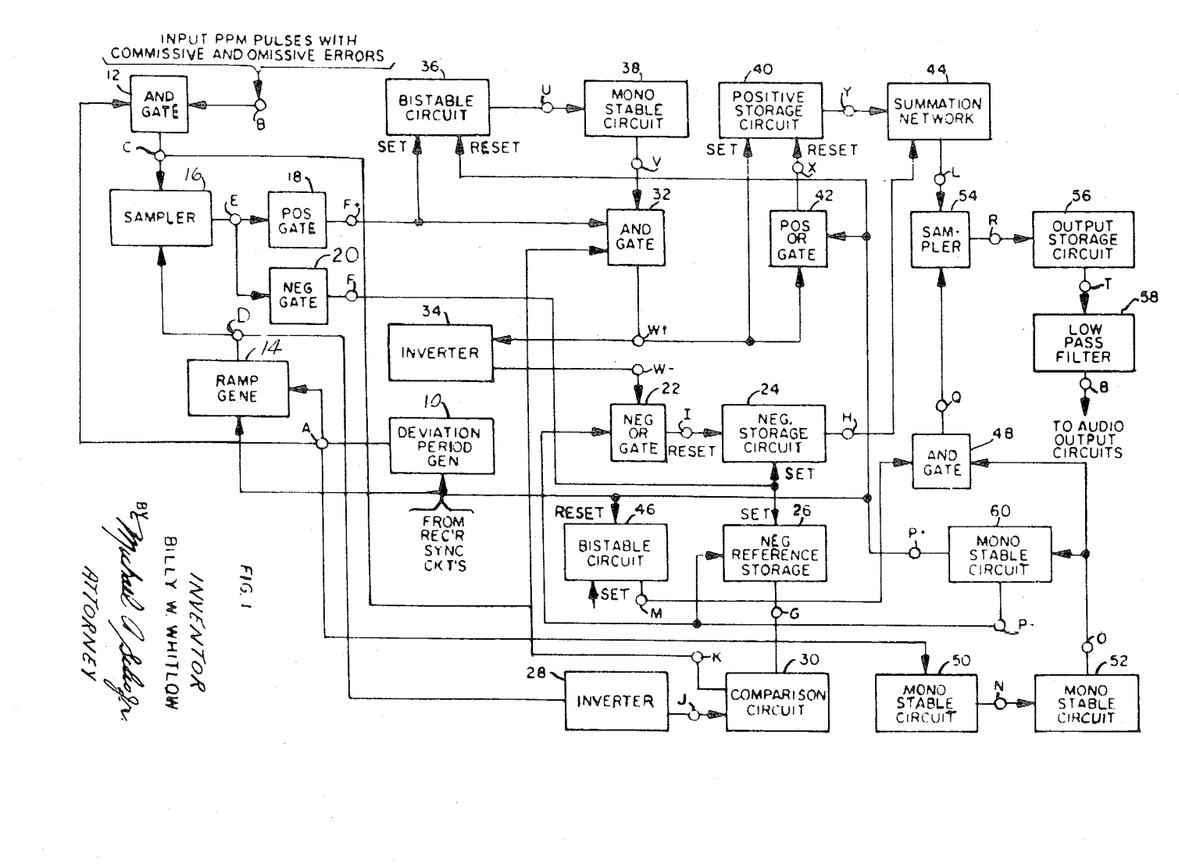
FIG. 1 is a block diagram of a preferred embodiment of the pulse selecting system in accordance with the present invention, the inputs to this circuit being PPM pulses with commissive and omissive errors which pulses are developed by the PPM receiver antenna circuits, and synchronizing signals developed by the PPM receiver synchronizing circuits.
Figure 2:
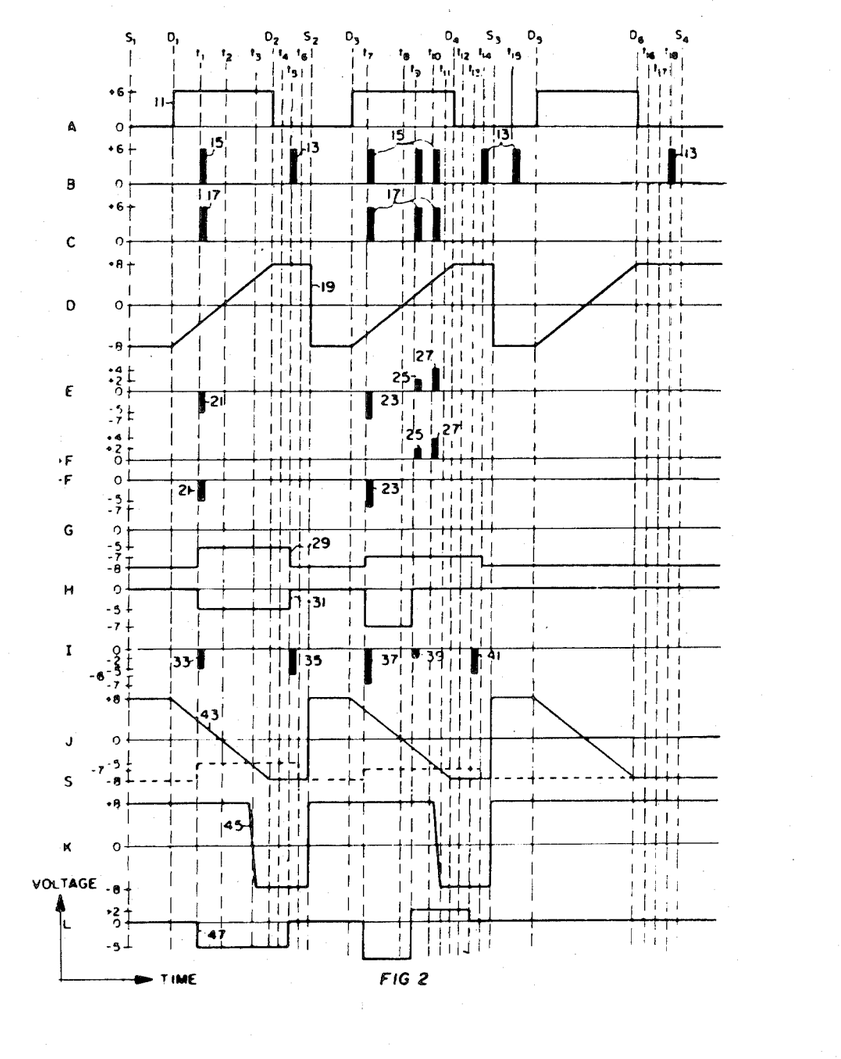
FIGS. 2 and 3 depict waveforms present at several appropriate terminals in the block diagram of FIG. 1, the vertical dashed lines of these figures representing pertinent time periods and are included to assist in the detailed explanation of the circuit of FIG. 1 and its mode of operation. Note that the bottom of FIG. 2 coincides from left to right with the top of FIG. 3.
Figure 3:
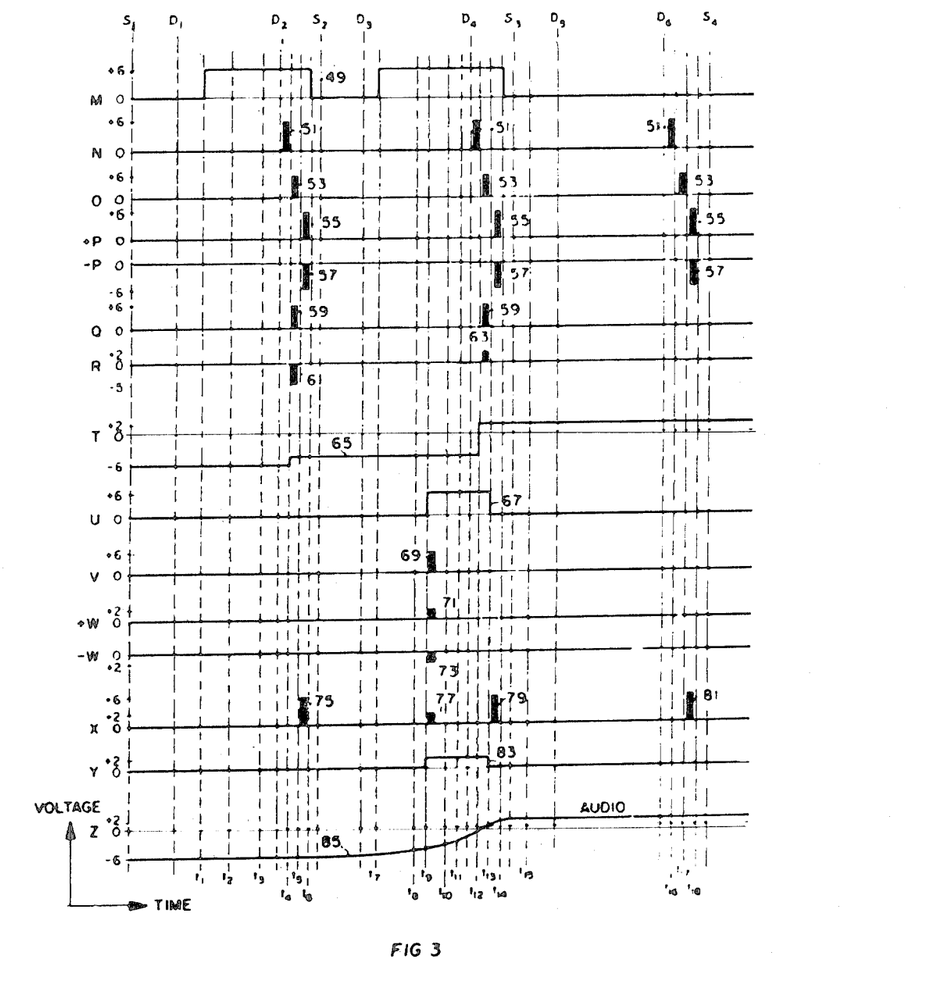

DETAILED DESCRIPTION, FIGS. 1-3

FIG. 1 sets forth a block diagram of a preferred embodiment of a pulse selecting system in accordance with the present invention, whereas FIGS. 2-3 depict several waveforms present at certain selected terminals of the block diagram of FIG. 1, and are included to assist in describing the block diagram of FIG. 1 and its mode of operation.

Note here that in FIGS. 2-3, the ordinate represents voltage units while the abscissa represents units of time, and that vertically extending dashed lines are included for representing three exemplary sample periods, $S_1-S_2$, $S_2-S_3$ and $S_3-S_4$; three exemplary deviation periods, $D_1-D_2$, $D_3-D_4$ and $D_5-D_6$; and several pertinent finite times $t_1-t_{18}$. Note also that the deviation periods $D_1-D_2$, $D_3-D_4$ and $D_5-D_6$ have a time duration less than the time duration of their respective sample periods. The purpose for providing a deviation period reasonably narrow with respect to the sample period is to reduce the undesirable effects of interference pulses which may occur during the beginning and end portions of the sample periods.

For purposes of this description, it will be assumed that conventional well-known pulse position modulation techniques are utilized by the PPM transmitter (not shown), and that appropriate synchronization between the transmitter and receiver is provided. Insofar as synchronization is concerned, if an external synchronizing technique is utilized, the transmitted sync signal will be detected by the receivers sync circuits and appropriately coupled to control the deviation period generator 16 as shown in FIG. 1. If, however, an internal or self-synchronizing technique is utilized, an internal control voltage will be developed by the receiver's sync circuits and used to control an internal clock generator, and it is the output of this clock generator which is appropriately coupled to control the deviation period generator 16. A more detailed description of a self-synchronous technique is disclosed in copending application, Ser. No. 235,315, filed Nov. 5, 1962, in the name of Lawrence H. Graham for a BALANCED OUTPUT COMMUNICATION DEVICE, which application is assigned to the assignee of the present invention.

Referring first to the left-hand portion of FIG. 1, the deviation period generator 10, AND-gate 12, ramp generator 14 and sampler 16 basically perform the function of demodulating any input PPM pulses applied to terminal B during the time period the AND-gate 12 is opened, such as during the deviation periods $D_1-D_2$, $D_3-D_4$ and $D_5-D_6$.

Deviation period generator 10 is of conventional design in that it is capable of developing a square wave such as square wave 11 of FIG. 2, at terminal A, in response to the application of synchronizing or trigger pulses (not shown) developed by the synchronizing circuits of the PPM receiver. Any well-known generator may be utilized so long as a square wave of predetermined and accurately controlled amplitude and width is provided. Since generators of this type are well known in the prior art, an exemplary circuit is not described in detail.

AND-gate 12 is also of conventional design with an ability to produce positive output voltages, such as pulses 17 of FIG. 2, at terminal C when positive voltages, such as square wave 11 and PPM pulses 13 and 15 of FIG. 2, of a predetermined voltage level are respectively applied to its two input terminals A and B. Since gating circuits of this type are also commonly known to skilled circuit designers, an exemplary circuit is not included herein.

Ramp generator 14 is also of conventional design in that it provides a linearly rising voltage, such as ramp wave 19 of FIG. 2, at terminal D upon application of a trigger voltage, such as square wave 11 of FIG. 2, on terminal A. Note here, that the ramp wave 19 is preferably of the type in which its slope commences at some negative voltage, such as −8 volts as shown in FIG. 2, passes through zero volts until it reaches some positive voltage, such as +8 volts as shown in FIG. 2, and continues at this positive voltage until the end of each sample period $S_1$, $S_2$ etc. A ramp generator of this type is preferable since it is capable of accurately developing ramp waves which linearly sweep through a predetermined range of voltages. A description of a preferred ramp generator circuit is set forth below with regard to the detailed description of FIG. 4.

Sampler 16 also is of conventional design in that it has a capability of developing output voltages, such as pulses 21, 23, 25 and 27 of FIG. 2, at terminal E, which are equal in amplitude and polarity to the voltage, such as ramp wave 19 of FIG. 2, which is applied to terminal D, during the time period in which signals, such as pulses 17 of FIG. 2, are applied to terminal C. A description of a preferred sampler circuit is set forth below with regard to the detailed description of FIG. 5.

In the exemplary block diagram of FIG. 1, the pulse width of each of the positive pulses of waveform 11 is by design equal to a predetermined deviation period, such as $D_1$–$D_2$ of FIG. 2, and such pulses are advantageously utilized to control the AND-gate 12 and the ramp generator 14 in time coincidence with the deviation periods $D_1$–$D_2$, $D_3$–$D_4$ and $D_5$–$D_6$.

The output of deviation period generator 10, which appears at terminal A, is accordingly coupled to AND-gate 12 and ramp generator 14, as well as to the monostable circuit 50, whereupon the leading edge of square wave 11 controls the time at which ramp wave 19 commences to linearly sweep from a minus voltage to a positive voltage, and triggers the monostable circuit 50; whereas the positive voltage portion of square wave 11 between its leading and trailing edges enables or opens the AND-gate 12 during the equal deviation periods $D_1$–$D_{2a}$, $D_3$–$D_4$ $D_5$–$D_6$ and permits any PPM pulses present on terminal B during the time duration between such leading and trailing edges of square wave 11 to be appropriately gated to the sampler 16. A description of the monostable circuits 50, 52 and 60 is set forth below with regard to the resetting feature of the present invention and the development of end of period (EOP) pulses such as EOP pulses 55 and 57 of FIG. 3.

Demodulation or conversion of the PPM pulses, such as pulses 15, which are gated through to the sampler 16, into pulse amplitude modulated pulses (PAM), such as pulses 21, 23, 25 and 27, is achieved by sampling the voltage of the ramp wave 19 Z-axis, the periods in which the gated PPM pulses 17 are present on terminal C. That is to say, the voltage level of ramp wave 19 that is present on terminal D when a PPM pulse 17 is present on terminal C will be coupled to terminal E. The relative time relationships between square wave 11, ramp wave 19, PPM pulses 13 and 15, gated PPM pulses 17, and PAM pulses 21, 23, 25 and 27 are graphically represented in the upper half of FIG. 2.

It will be apparent at this point that deviation period generator 10, AND-gate 12, ramp generator 14 and sampler 16, in combination, convert the position of any PPM pulses present on terminal B during the equal deviation periods $D_1$–$D_2$, $D_3$–$D_4$ and $D_5$–$D_6$ into amplitude modulated pulses (PAM). Accordingly, the time positions of gated pulses 17 establish what voltage level of ramp wave 19 will be coupled to terminal E. Note in FIG. 2 for example, the intercept of the time lines $t_1$, $t_7$, $t_{10}$ and $t_{11}$ relative to the ramp wave 19.

PAM pulses 21, 23, 25 and 27 are then sequentially coupled to the positive and negative gates 18 and 20, which gates are also of conventional design with a capability of respectively passing only positive or negative pulses to their respective output terminals F+ or F−. Note here that the positive PAM pulses 25 and 27 are shown in FIG. 2 at terminal F+; whereas the negative PAM pulses 21 and 23 are shown at terminal F− of FIG. 2. A detailed description of both a preferred positive gate and a preferred negative gate is set forth below with regard to the detailed description of FIGS. 8 and 9, respectively.

Referring again to terminal F−, all negative PAM pulses, such as pulse 21, which occur during the deviation period $D_1$–$D_{2a}$ as shown in FIG. 2, are coupled to the set terminals of both the negative storage circuit 24 and the negative reference storage circuit 26, whereupon the voltage level of such negative PAM pulse is stored in these circuits. To insure that the negative storage circuit 24 will be discharged whenever a negative PAM pulse appears on its set terminal, each negative PAM pulse is also coupled to the reset terminal of storage circuit 24 via OR gate 22, as shown for example in FIG. 2, as pulse 33.

The negative storage circuit 24 is preferably designed so as to differentiate each negative PAM pulse and develop a negative "spike" of energy related in time to the leading edge of each negative PAM pulse thereby permitting the leading edge of each negative PAM pulse to reset the circuit 24. The positive "spike" of energy which is related in time to the trailing edge of each PAM pulse will have no effect upon the reset storage of circuit 24. Accordingly, after the negative "spike" of energy resets circuit 24, the voltage level of the latter portion of each negative PAM pulse, which is applied to the terminal of storage circuit 24, will be appropriately stored. The voltage level stored in storage circuit 24 appears on terminal H and is appropriately coupled to the summation network 44, the effect and purpose of which will be described later. A detailed description of a preferred negative storage circuit is set forth below with regard to the description of FIG. 10.

Turning to the negative reference storage circuit 26, this circuit is preferably designed so that each negative PAM pulse occurring on its set terminal will first charge the storage element of this circuit to a predetermined reference voltage level before storing the negative voltage level of such negative PAM pulses. This reference voltage charging feature is achieved by differentiating the negative PAM pulse and developing a negative "spike" of energy related in time to the leading edge of such negative PAM pulses thereby permitting the leading edge of such negative PAM pulses to control the charging of such storage element to such reference voltage. The positive "spike" of energy which is related in time to the trailing edge of each negative PAM pulse will have no effect upon the storage element of storage circuit 26. Accordingly, after the negative "spike" of energy charges the storage element to the reference voltage level, the voltage level of the latter portion of the negative PAM pulse discharges the storage element to the voltage level of such negative PAM pulse. A detailed description of a preferred negative reference storage circuit is set forth below respecting the description of FIG. 11.

Referring now to the comparison circuit 30, the output of the negative reference storage circuit 26, which appears at terminal G, is appropriately coupled to the comparison circuit 30. The other input to comparison circuit 30 is developed by coupling the output of ramp generator 14, i.e., ramp wave 19, to the inverter 28 via terminal D, whereby the ramp wave 19 developed by the ramp generator 14, is inverted or phase shifted 180° (note inverted ramp wave 43) and is appropriately coupled to the comparison circuit 30 via the terminal J. The output of comparison circuit 30 is then coupled to the AND-gate 32 via terminal K and is utilized to inhibit this AND gate whenever a predetermined condition occurs with regard to the voltage level of the output of the negative reference storage circuit 26, which appears at terminal G, and the voltage level of the output of the inverter 28, which appears at terminal J.

It should be recalled here, that the prime object of the pulse selector of the present invention is to decide whether the last-occurring negative PAM pulse appearing on terminal F− during any one sample period is closer to the center of such sample period than the first-occurring positive PAM pulse appearing on terminal F+ during that same sample period. Thus, comparison and decision circuitry is uniquely provided for selecting one of these two PAM pulses as the intelligence pulse. Note here that since the voltage levels of the PAM pulses present on either F+ or F− depend upon the voltage level of the ramp wave 19 on terminal D at the time of occurrence of the PPM pulses 17 on terminal C, and since the inverted ramp wave 43 on terminal J sweeps through a voltage range between +V and −V, when the voltage level of the inverted ramp wave 43 reaches a negative value which is greater than the negative voltage stored in the negative reference storage circuit 26, any subsequently occurring positive PAM pulses on terminal F+ must necessarily be farther from the center of the sample period than the last-occurring negative PAM pulse. Therefore, circuit means are provided for advantageously permitting only the first-occurring positive PAM pulse to be processed and stored, so long as such positive PAM pulse occurs before the inverted ramp wave 43 reaches a negative voltage greater in value than the value of the negative voltage stored in storage circuit 26.

To achieve the foregoing comparison and decision feature of the present invention, all positive PAM pulses appearing on terminal F+ are appropriately coupled to both the AND-gate 32 and to the set terminal of bistable circuit 36. When the first positive PAM pulse occurs, it will be gated through the AND-gate and coupled to the set terminal of the positive storage circuit 40 via terminal W+ if the inverted ramp wave 43 on terminal J is not greater than the negative voltage stored in storage circuit 26. Of course, such first positive PAM pulse will not be gated through AND-gate 32 if the comparison circuit 30 develops an inhibiting voltage relative to the outputs of storage circuit 26 and inverter 28 as mentioned above. To insure that all subsequent positive PAM pulses will not be processed by the pulse selector and consequently stored in storage circuit 40, the bistable circuit 36 and monostable circuit 38 are included. That is to say, when the bistable circuit 36 is driven to one of its stable states, such as when the first positive PAM pulse is applied to its set terminal, the output of bistable circuit 36, which is coupled to the monostable circuit 38 via terminal V, drives monostable circuit 38 into operation, whereby the AND-gate 32 is opened and the first positive PAM pulse passes to terminal W+. At some predetermined finite time after the occurrence of the leading edge of the voltage developed by bistable circuit 36, monostable circuit 38 returns to its normal operating condition and the AND-gate 32 is thereby again inhibited by the output voltage of monostable circuit 38, which is coupled to AND-gate 32 via terminal V.

Again, it should be noted that the only positive PAM pulse that can ever be closer to the center of any sample period than the last negative PAM pulse to occur during that same sample period, is the first positive PAM pulse to occur, and that all subsequently occurring positive PAM pulses, although not necessarily farther from the center of this particular sample period than the last-occurring negative PAM pulse, are clearly farther from the center of the sample period than is the first-occurring positive PAM pulse.

To insure that the positive storage circuit 40 is reset or discharged whenever the first positive PAM pulse is applied to its set terminal, such first positive PAM pulse is also coupled to the reset terminal of the storage circuit 40 via OR-gate 42 and terminal X. The positive OR-gate 42 and the reset circuit of storage circuit 40 are respectively similar in function to the negative OR-gate 22 and the reset circuit of negative storage circuit 24. That is to say, only the leading edge of the positive PAM pulse occurring on terminal W+ will reset the storage circuit 40, and the voltage level of the latter portion of such pulse will thereafter be stored in the storage circuit 40.

In addition to the resetting of storage circuit 40, it is necessary that the negative storage circuit 24 also be reset or discharged whenever a positive PAM pulse is applied to the AND-gate 32 before an inhibiting voltage is developed by the comparison circuit 30 and applied to the AND-gate 32. This resetting of the negative storage circuit 24 is provided by coupling the first PAM pulse occurring on terminal W+ to the inverter 34, whereupon such pulse is inverted or phase shifted 180° and coupled to the reset terminal of the negative storage circuit 24 via the terminal W−, the negative OR-gate 22, and terminal I. Note that the negative storage circuit 24 will be discharged under the foregoing circumstances and that the only voltage stored by the pulse selector of FIG. 1 will be that voltage stored in storage circuit 40. Accordingly, at the end of each deviation period, a voltage will be stored in either the positive or the negative storage circuits depending, of course, upon the time occurrence of the last negative PAM pulse on terminal F− with respect to the time occurrence of the first positive PAM pulse on terminal F+.

The outputs of the negative storage circuit 24 and the positive storage circuit 40 are respectively coupled to the summation network 44 via terminals H and Y. The output of the summation network 44 is then appropriately coupled to the sampler 54 via terminal L and will be thereafter coupled via terminal R to the output storage circuit 56 upon the occurrence of a gating voltage on terminal Q. The development of this gating voltage is as follows:

When square wave 11 falls to approximately zero volts, i.e., at the end of each deviation period, the monostable circuit 50 is triggered, whereupon a pulse of a predetermined amplitude and width is generated and coupled to the monostable circuit 52 via terminal N. Similarly, monostable circuit 52 develops a pulse of a predetermined amplitude and width, and couples such latter pulse to both the monostable circuit 60 and to the AND gate 48 via terminal O.

Referring back to terminal C, which is the output of AND-gate 12, when the first PPM pulse occurs during any particular deviation period, the bistable circuit 46 is triggered or driven to one of its stable states. The output of bistable circuit 46 is then appropriately coupled via terminal M to one input of the AND-gate 48. When the circuit 46 is in this stable state, the required voltage to open AND-gate 48 is provided so that when the monostable circuit 52 develops a pulse, such as pulse 51 of FIG. 3, the AND-gate 48 is opened and appropriately couples such pulse to the sampler 54, thereby sampling the voltage developed in the summation network 44 and coupling such sampled voltage to the output storage circuit 56.

Note that sampler 54 is similar in all respects to the sampler 16 above described. Note also that when the AND-gate 48 is open, the voltages stored in either the negative storage circuit 24 or the positive storage circuit 40 will be sampled by sampler 54 and stored in output storage circuit 56. The output of storage circuit 56 is then coupled to the audio output circuits of the PPM receiver (not shown) via terminal T, low pass filter 58, and terminal Z, and utilized as the intelligence transmitted by the PPM transmitter (not shown) during this particular sample period.

The output storage circuit 56 is preferably designed so that no "clearing" or storage circuit discharging voltage is necessary at the end of each sample period, thus enabling the pulse selector to account for the undesirable condition in which no PPM pulses, not even noise pulses, occur during the sample period. That is to say, when no PPM pulses or other interference pulses occur during any one sample period (omissive error), no voltage is developed by the summation network 44 and accordingly no voltage will be coupled to the storage circuit 56 at the end of such sample period. Thus, by not clearing storage circuit 56, the voltage stored therein and utilized as the intelligence transmitted during the immediately previous sample period may be utilized as the intelligence for this sample period. Accordingly, the output storage circuit 56 may be similar in all respects to the storage circuit of FIG. 11 except the reference voltage charging feature and the EOP "-clearing" feature will be excluded thereby permitting the storage element of this circuit to store voltage levels between −V and +V volts. Note, of course, that storage circuit 56 is preferably designed so as to store whatever voltage is applied to its input terminal R without regard to an voltage previously stored, and such new stored voltage will also appear at its output terminal T.

The EOP pulses for resetting and discharging purposes are developed by the monostable circuit 60, which receives at its input terminal the pulses developed by the monostable circuit 52. Monostable circuit 60 has two output terminals P+ and P−, upon which pulses of equal time relationship and width but of opposite polarity respectively occur. The positive EOP pulses, which appear on terminal P+, are coupled to the reset terminals of bistable circuit 36, positive storage circuit 40 via positive OR-gate 42, bistable circuit 46, and the ramp generator 14. Thus, when the positive EOP pulses occur, bistable circuits 36 and 46 are driven to their normal operating or original states; whereas the positive storage circuit 40 is discharged. The positive EOP pulses also drive the ramp generator 14 into a condition whereby the storage or charging element thereof is prevented from charging above a predetermined voltage. The negative EOP pulses, which appear on terminal P−, are utilized to discharge both the negative storage circuit 24 and the negative reference storage circuit 26. This is accomplished by coupling the negative EOP pulses to the reset terminal I of the storage circuit 24 via the negative OR 22, and to the reset terminal of the storage circuit 26.

A mode of operation of the pulse selector of FIG. 1 in light of the selected waveforms of FIGS. 2 and 3 follows below.

MODE OF OPERATION, FIGURE 1–3

To assist in the description of a mode of operation of the block diagram of FIG. 1, it will again be assumed that conventional well-known pulse position modulated techniques are utilized by the PPM transmitter (not shown), and that appropriate synchronization between the PPM transmitter and the PPM receiver is provided.

In the embodiment of FIG. 1, the deviation period generator 10, which is responsive to synchronizing signals from the receivers sync circuits, develops a series of square waves each having a pulse width equal to the desired deviation period; whereas, the monostable circuits 50, 52 and 60, in combination, develop two series of spaced pulses at terminals P+ and P−, with each series of pulses having a time duration between adjacent pulses which is equal to the desired sample period. That is, the monostable circuit 50 which is responsive to the trailing edge of the square wave 11 developed by the deviation period generator 10, develops a single pulse which triggers the monostable circuit 52, which latter circuit also develops a single pulse which triggers the monostable circuit 60. The monostable circuit 60 develops both positive and negative EOP pulses which are appropriately utilized to reset the pulse selector.

In the waveforms of FIG. 2, each of the equal deviation periods, $D_1$–$D_2$, $D_3$–$D_4$ and $D_5$–$D_6$, have a time duration less than the time duration of their respective sample periods $S_1$–$S_2$, $S_2$–$S_3$ and $S_3$–$S_4$. Since a detailed description of the advantages of having deviation periods substantially narrower than the sample periods was set forth earlier, it will suffice to merely state here that the prime purpose of this feature is to reduce the undesirable effects of any interference pulses which may occur during the early and late portions of each sample period.

At time $S_1$, the sample period immediately prior to the first sample period $S_1$–$S_2$ is completed, and the voltage condition of the circuit elements of FIG. 1 are as follows: (1) the deviation period generator 10, ramp generator 14, bistable circuit 36, monostable circuit 38, bistable circuit 46, and monostable circuits 50, 52 and 60 are all in their low voltage or normal quiescent state, such as zero volts or minus eight volts as shown by the waveforms 11, 19, 67, 69, 49, 51, 53 and 55–57, respectively, of FIGS. 2–3; (2) the voltages stored in the negative storage circuit 24, the negative reference storage circuit 26 and the positive storage circuit 40, are respectively zero, minus eight and zero volts, as shown in the waveforms 31, 29 and 83, respectively, of FIGS. 2–3; (3) the storage condition of output storage circuit 56 is minus six volts, which represents the voltage level of the intelligence transmitted during the immediately previous sample period.

As will be described in considerable detail later, the above storage condition of each of the storage circuits 24, 26, 40 and 56 may be interpreted as follows: (1) the storage circuits 24, 26 and 40 are in their normal storage condition in readiness for storing the voltage levels of the negative and positive PAM pulses which may occur during the sample period $S_1$–$S_2$; (2) the pulse selected during the previous sample period was the last negative PAM pulse and that this pulse has a voltage level of minus six volts, which is appropriately stored in the storage circuit 56 and was utilized as the intelligence coupled to the output circuits of the PPM receiver during the sample period immediately preceding sample period $S_1$–$S_2$.

At time $D_1$, the square wave 11 rises to a positive potential, such as 8 volts, thereby opening the AND-gate 12 and permitting any PPM pulses present on terminal B during this time period to be gated through AND-gate 12 to the sampler 16, and continues at this voltage level until time $D_2$.

Note here that square wave 11 also opens AND-gate 12 during times $D_3$–$D_4$ and $D_5$–$D_6$, while it inhibits or closes the AND-gate 12 during times $D_2$–$D_3$, $D_4$–$D_5$ and $D_6$+. Note also that the PPM pulses 15, which also appear on terminal B, occur within the deviation periods $D_1$–$D_2$ and $D_3$–$D_4$; whereas no PPM pulses occur, not even interference pulses, during the deviation period $D_5$–$D_6$. Thus, deviation period $D_1$–$D_2$ represents the condition in which only the intelligence pulse occurs, (no error), deviation period $D_3$–$D_4$ represents the condition in which more than one pulse occurs (commissive error), and deviation period $D_5$–$D_6$ represents the condition in which no pulses occur (omissive error).

The square wave 11 developed by the deviation period generator 10, is also coupled to the ramp generator 14 via terminal A, wherein a linear ramp wave 19 is developed, as shown in FIG. 2. The linear slope portion of the ramp wave 19 has a width substantially equal to the pulse width of the square wave 11, and such ramp portion commences or rises at times $D_1$, $D_3$ and $D_5$ and ends at times $D_2$, $D_4$ and $D_6$. Note that the ramp wave 19 holds the voltage level it reaches at time $D_2$, $D_4$ and $D_6$ until the end of the sample periods $S_1$–$S_2$, $S_2$–$S_3$ and $S_3$–$S_{4a}$, respectively. This feature is necessary so that the proper voltage is coupled to the inverter 28 and appropriately utilized in the comparison circuit 30 for developing the necessary inhibiting voltage that is to be utilized to close the AND-gate 32 after the absolute voltage level of the ramp wave 19 exceeds the voltage level of the last occurring negative PAM pulse which is appropriately stored in the storage circuit 26. The ramp wave 19 is appropriately coupled to the sampler 16 via terminal D. A description of the comparison circuit 30 with respect to the storage circuit 26 and the inverter 28 is set forth below in greater detail.

At time $t_1$, when the first gated PPM pulse 17 is coupled to the sampler 16, via terminal C, the voltage level of ramp wave 19 present on terminal D at this time interval is coupled to both the positive and negative gates 18 and 20 via terminal E. Pulse 21 of FIG. 2 graphically represents the sampled voltage of ramp wave 19 during the time duration of the first gated pulse 17, and appears on terminal E at time $t_1$. Since the voltage of ramp wave 19 is less than zero volts at time $t_1$, the sampled pulse 211 will also be less than zero volts, and in the example shown in FIG. 2 this voltage level is minus five volts. Pulse 21 is prevented from passing to terminal F+ by the positive gate 18, but is permitted to pass to terminal F− by the negative gate 20 and is appropriately coupled to the negative OR-gate 22, negative storage circuit 24, and the negative reference storage circuit 26.

Before the voltage level of pulse 21 is stored in the storage circuit 24 it is preferable that this circuit be discharged. The discharging of storage circuit 24 is accomplished by coupling pulse 21 to the reset terminal I of storage circuit 24 via the negative OR-gate 22. That is to say, by utilizing the leading edge or the front portion of pulse 21 to discharge storage circuit 24, and by preventing the latter portion or trailing edge of pulse 21 from affecting the reset circuit of storage circuit 24, the discharging of this circuit prior to the storage of the voltage level of pulse 21 can be accomplished. The latter portion of pulse 21 is then separately utilized to charge the storage circuit 24 to the voltage level of pulse 21. The voltage stored in circuit 24 is then coupled to the summation network 44 via terminal H. A detailed description of s storage circuit which will effectively accomplish this desired discharging and storing function is set forth in FIG. 10 and is described in detail below. Referring now to storage circuit 26, before the first negative PAM pulse occurs, the storage component will be charged to some negative voltage, such as −8 volts. This is necessary so that the proper negative voltage will be coupled to the comparison circuit 30 when no negative PAM pulse occurs during our sample period. It is also necessary that this circuit be first discharged to a predetermined reference voltage, such as zero volts in the example of FIG. 1, before the voltage level of pulse 21 is stored therein. It will be apparent that this discharging feature is necessary so that the proper voltage will be stored upon the occurrence of a negative PAM pulse. This discharging and storage feature may be accomplished by utilizing the leading or front portion of pulse 21 to control the storage component of this circuit, and by preventing the latter portion or trailing edge of pulse 21 from affecting such storage component. Then, the latter portion of pulse 21 is separately utilized to charge such storage components to the voltage level of pulse 21, which in the example of FIG. 1 would be a negative voltage. The voltage stored in circuit 26 is then coupled to the comparison circuit 30 via terminal G. A detailed description of a storage circuit which will effectively accomplish this desired discharging and storing function is set forth in FIG. 11 and described in detail below.

Referring back to terminal D, the ramp wave 19 developed by the ramp generator 14 is coupled to the inverter 28, the inverter ramp wave 43, which will be 180° phase shifted with respect to the ramp wave 19, will appear on terminal J and also be coupled to the comparison circuit 30. The voltages applied to the comparison circuit 30 are graphically represented in FIG. 2, and to assist in the explanation of comparison circuit 30, the voltage on terminal G is shown in phantom in time relation to the inverted ramp wave 43.

At time $t_2$, the ramp wave 19 reaches zero volts and thereafter commences to linearly sweep through a positive range of voltages. Thus any PPM pulses present on terminal B after time $t_2$ will be of a positive polarity.

Note here that during the time interval $t_2$–$t_3$, the absolute voltage level of the ramp wave 17 is less than the absolute voltage level of the last negative PAM pulse to occur during deviation period $D_1$–$D_2$ which in the example of FIG. 2 is pulse 21; or conversely the voltage level of the inverted ramp wave 43 is greater than the voltage level present on terminal G. Comparison circuit 30 is designed such that under this relative voltage level condition of the ramp waves 19–43 and the negative PAM pulse 21, the output thereof, which appears at terminal K, will be of sufficient voltage level to open the AND-gate 32 so that any positive PAM pulses present on terminal F+ during this time interval will be appropriately gated to the terminal W+. Of course, no positive PAM pulses will occur until the ramp wave 19 exceeds zero volts. As stated earlier, after ramp wave 19 exceeds zero volts and before $t_3$ or as in the example of FIG. 1 when the inverted ramp wave 43 falls below zero volts, any positive PAM pulse occurring on terminal F+ must necessarily be closer to the center of the sample period $S_1$–$S_2$ than the last-occurring negative PAM pulse stored in storage circuit 26. However, since only one PPM pulse occurs during deviation period $D_1$–$D_2$, and that pulse was converted into the negative PAM 21, no positive PAM pulses will appear on terminal F+ and be gated to terminal W+ by the AND-gate 32.

At time $t_3$, the inverted ramp wave 43 falls below the voltage present on terminal G and the comparison circuit 30 develops a voltage at terminal K which inhibits AND-gate 32 and thereby prevents any pulses present on terminal F+ from passing to terminal W+. Note that the relative time position of square wave 11, PPM pulses 13 and 15, gated PPM pulses 17, ramp wave 19 negative PAM pulse 21, the stored voltage 29, inverted ramp wave 43 and gating voltage 45 are graphically represented in FIG. 2.

At time $D_2$, the square wave 11 falls to zero volts thereby completing the deviation period $D_1$–$D_2$ and preventing any PPM pulses thereafter present at terminal B from passing to terminal C. Note that the first sample period $S_1$–$S_2$ represents the condition in which only one intelligence pulse 15 occurs (no error) during the deviation period $D_1$–$D_2$. Thus, no comparison and decision is made regarding the selection of the last-occurring negative PAM pulse in lieu of the first occurring positive PAM pulse (commissive error).

Again referring back to terminal A, when square wave 11 falls 5zero volts, the monostable circuit 50 is triggered and thereby develops a pulse having a predetermined pulse width, such as pulse 51 of FIG. 3. and couples this pulse 51 to the monostable circuit 52 via terminal N. At time $t_4$, when pulse 51 falls to zero volts, the monostable circuit 52 is triggered thereby developing a pulse also of a predetermined pulse width, such as pulse 53 of FIG. 3, and couples this pulse 53 to the monostable circuit 60. At time $t_5$, when pulse 53 falls to zero volts the monostable circuit 60 is triggered. Monostable circuit 60 develops two pulses of a predetermined pulse width but of opposite polarities, which pulses appear on terminals P+ and P−, respectively, such as pulses 55 and 57, respectively, of FIG. 3. Pulse 55 and 57 will herein after be referred to as the positive and negative EOP pulses.

The positive EOP pulse 55 is coupled to the reset terminals of the bistable circuits 36 and 46, OR-gate 42, and to the ramp generator 14. Thus, at time $t_5$, the EOP pulse 55 discharges the storage circuit 40, resets or drives the bistable circuits 36 and 46 back to their original or quiescent state, and prevents the storage component of the ramp generator 14 from charging above a predetermined voltage level, such as zero volts in the circuit of FIG. 1; whereas, the negative EOP pulse 57 is coupled to the reset terminals of the negative reference storage circuit 26 and the negative storage circuit 24 via the negative OR gate 22, thereby discharging the storage circuits.

Referring back to terminal C, when the first PPM pulse 17 appears thereon, the bistable circuit 46 is set or driven to one of its stable states whereby a voltage of proper amplitude and polarity is coupled to AND-gate 48 via terminal M, and such AND gate is held in this condition until the positive EOP pulse 55 developed by the monostable circuit 60 resets bistable circuit 46. However, before the circuit of FIG. 1 is reset, the pulse 53 developed by the monostable circuit 52 is coupled to the AND-gate 48 and in combination with the output of bistable circuit 46 passes pulse 53 to terminal Q thereby providing a sampling voltage to the sampler 54 and permitting the voltage developed by the summation network 44 to be coupled to the output storage circuit 56 via terminal R. Thus, just prior to time $S_2$, the voltage on storage circuit 56 will be changed, depending, or course, upon the voltage developed by the summation network 44. The voltage stored in circuit 56 is appropriately coupled to the audio output circuits of the PPM receiver (not shown) via terminal T, low pass filter 58 and terminal Z, and utilized as the intelligence transmitted during sample period $S_1$–$S_2$.

At time $S_2$ sample period $S_1$–$S_2$ is completed and the circuit of FIG. 1 is placed in condition to receive, analyze, compare and decide what voltage information will be coupled to the PPM receiver output circuit during the next sample period $S_2$–$S_3$.

Note here that at time $t_5$ the first PPM pulse 13 appears on terminal B, however, since the time of occurrence of this pulse is not within the deviation period $D_1$–$D_2$, such pulse is not gated through the AND-gate 12 and accordingly it is not processed by the pulse selector of the present invention. Of course, this aspect is true in so far as any PPM pulse which occurs either before or after any of the deviation periods of any of the sample periods.

At time $D_3$, the square wave 11 again rises to a positive potential, such as 8 volts and continues at this voltage level until time $D_4$ thereby again opening the AND-gate 12 and permitting any PPM pulses present on terminal B during this time period to be gated through AND-gate 12 to sampler 16. As stated earlier square wave 11 causes the ramp generator 14 to again sweep through a linear range of voltages, as shown in FIG. 2. Again note that at time $D_4$ the ramp wave reaches its maximum voltage level and continues at this level until time S₃.

At time $t_7$, when the second gated PPM pulse 17 is coupled to the sampler 16 via terminal C, the voltage level of the ramp wave 19 present on terminal D at this time interval is coupled to both the positive and negative gates 18 and 20 via terminal E. Pulse 23 of FIG. 2 graphically represents the sampled voltage of ramp wave 19 during the time duration of the second gated pulse 17, and appears at terminal E at time $t_7$. Since the voltage level of ramp wave 19 is less than zero volts at time $t_7$, the sample pulse 23 will be also less than zero volts, and in the example shown in FIG. 2, this voltage level is −7 volts.

Pulse 23 is prevented from passing to the terminal F+ by the positive gate 18, but is permitted to pass to terminal F− by the negative gate 20, and is appropriately coupled to the negative OR-gate 22, negative storage circuit 24, and the negative reference storage circuit 26. As stated earlier with regard to sample pulse 21, the leading portion of pulse 23 discharges storage circuit 24; whereas, the latter portion of pulse 23 charges the storage circuit 24. The voltage stored in circuit 24 is then coupled to the summation network 44 via terminal H. Also, as stated above respecting the sample pulse 21, the leading portion of this pulse discharges the storage circuit 26 to a predetermined voltage reference, such as zero volts, whereupon the latter portion of this pulse charges storage circuit 26. The voltage stored in storage circuit 26 is then coupled to the comparison circuit 30 via terminal G.

Again, the ramp wave 19 is coupled to the inverter 28 and inverted or phase shifted 180°, which inverted ramp wave 43 is coupled to the comparison circuit 30. Since the voltage level of the inverted ramp wave 43 at time $t_7$ is greater than the voltage level present on terminal G, which is the voltage level of sample pulse 23, the comparison circuit 30 develops a voltage of sufficient amplitude to open the AND-gate 32 so that any positive PAM pulse present on terminal F+ at this time will be appropriately gated to the terminal W+.

At time $t_8$, the ramp wave 19 reaches zero volts and thereafter commences to linearly sweep through a positive range of voltages. Thus, any PPM pulses present on terminal B after time $t_9$ will necessarily be of a positive polarity.

At time $t_9$, the third gated PPM pulse 17 is coupled to the sampler 16 via terminal C, and the voltage level of the ramp wave 19 present on terminal D at this time period is coupled to both the positive and the negative gates 18 and 20 via terminal E. Pulse 25 of FIG. 2 graphically represents the sample voltage of ramp wave 19 during the time duration of the third gated pulse 17, and appears at terminal E at time $t_9$. Since the voltage level of ramp wave 19 is greater than zero volts at time $t_9$ the sample pulse 25 will be also greater than zero volts and in the example shown in FIG. 2, this voltage level is +2 volts.

In this case pulse 25 is permitted to pass to terminal F+ by the positive gate 18, but is prevented from passing to terminal F− by the negative gate 20 and is appropriately coupled to the AND-gate 32 and to the set terminal of the bistable circuit 36. Since the voltage level of the inverted ramp wave 43 is still greater than the voltage level stored in storage circuit 26, the output voltage of the comparison circuit 30 is still of sufficient value to hold the AND-gate 32 open, thus, gating pulse 25 to terminal W+. Pulse 25 performs three essential functions: First, after being inverted by inverter 34, i.e. phase shifted 180°, it resets the storage circuit 24. This in effect discharges the storage circuit 24. Second, the leading portion of pulse 25 resets or discharges the positive storage circuit 40 in a similar manner as above described regarding the discharging of storage circuit 24 by the negative PAM pulse 21. Third, the later portion of pulse 25 charges the storage circuit 40 to a positive voltage level, which in this case is +2 volts. The output of storage circuit 40 is appropriately coupled to the summation network 44 via terminal Y.

Referring back to terminal F+, when the first positive pulse 25 appeared thereon it drove the bistable circuit 36 into one of its stable states and this circuit remains in this condition until it is reset by the positive EOP pulses developed by the monostable circuit 60. The output of bistable circuit 36 triggers the monostable circuit 38, which in turn develops a pulse of sufficient amplitude and of predetermined width so as to open the AND-gate 32 for a predetermined time interval. That is to say, when a positive pulse occurs on terminal F+ a pulse will be developed by monostable circuit 38 which will open the AND-gate 32 and permit the positive PAM pulse on terminal F+ to pass to terminal W+. Of course, thereafter the AND-gate 32 will be again inhibited and any subsequently occurring positive PAM pulses will not be gated to the terminal W+.

Briefly restating, the AND-gate 32 is controlled by both the voltage developed by the comparison circuit 30, which is directly related to the relative voltage conditions of the inverted ramp wave 43 and the voltage stored in circuit 26, and by the pulse developed by the monostable circuit 38, which depends upon the occurrence of a PAM pulse on terminal F+. Therefore, it is only possible for the first positive PAM pulse to be gated to terminal W+ and this will depend upon the voltage developed by comparison circuit 30. All subsequent positive PAM pulses occurring on terminal F+ will be prevented from passing to terminal W+ by the combined circuit operation of bistable circuit 36 and monostable circuit 38. Clearly, it is essential that the foregoing gating arrangement of the AND-gate 32 be included. First, because the first positive PAM pulse present on terminal F+ must necessarily be closer to the center of the sample period then any subsequently occurring positive PAM pulse. For this reason all subsequent positive PAM pulses are disregarded and not processed by the pulse selector of the present invention. Second, since the voltage of the last half of the ramp wave 19 linearly increases with time, the only positive PAM pulses that could be closer to the center of the sample period would be those pulses having an absolute voltage level less than the absolute voltage level of the last-occurring negative PAM pulse. It will be apparent at this point that the AND-gate 32 is appropriately designed to permit only the first-occurring positive PAM pulse to be gated to terminal W+ when it has an absolute voltage level less than the absolute voltage level of the last-occurring negative PAM pulse. Of course, when a positive PAM pulse appears on terminal W+, the negative storage circuit 24 is discharged and the voltage level of that positive PAM pulse is appropriately stored in the positive storage circuit 40 for subsequent utilization as the intelligence transmitted during that particular sample period.

At time $t_{10}$ the fourth gated PPM pulse 17 appears on terminal C, and PAM pulse 27 is developed and coupled to terminal F+. However, since this is the second occurring positive PAM pulse it is disregarded and not processed by the pulse selector of the present invention. That is to say, pulse 27 has no effect upon the bistable circuit 36 and is prevented from passing to terminal W+ by the inhibiting voltage developed by the monostable circuit 38. Note here that even if pulse 27 occurs before the voltage level of the inverted ramp wave falls below the voltage level stored in storage circuit 26, as is the case here, it would still be prevented from passing to terminal W+.

It will be apparent here that during the deviation period $D_3$–$D_4$, the pulse selector of the present invention has decided that the PAM pulse 25 is the pulse closest to the center of the sample period $S_2$–$S_3$, and the voltage level of this pulse is appropriately stored in storage circuit 40.

At time $t_{11}$, the inverted ramp wave 43 falls below the voltage on terminal G and the comparison circuit again develops a voltage at terminal K which inhibits AND-gate 32 and again prevents any pulses present on terminal F+ from passing to terminal W+.

At time $D_2$ the square wave 11 again falls to zero volts thereby completing the deviation period $D_3$–$D_4$ and preventing any PPM pulses thereafter present at terminal B from passing to terminal C. Note that this second sample period $S_2$–$S_3$ represents the condition in which more than one intelligence pulse occurred (commissive error) during the deviation period $D_3$–$D_4$.

Again referring back to terminal A when the square wave 11 falls to zero volts the monostable circuit 50 is triggered and a pulse of sufficient amplitude and a predetermined width is coupled to monostable circuit 52 thereby triggering this latter circuit and developing another pulse of sufficient amplitude and predetermined width. This latter pulse is graphically represented in FIG. 3 as pulse 53 and is appropriately coupled to AND-gate 48. As mentioned above with regard to the first sample period, when the first gated PPM pulse 17 appeared on terminal C during the deviation period $D_3$–$D_4$ the bistable circuit 46 is triggered thereby developing a voltage of sufficient amplitude to open the AND-gate 48, and such voltage is maintained until the bistable circuit 46 is reset by a positive EOP pulse. Thus, when the monostable circuit 52 develops a pulse, such as pulse 53 at time $t_{12}$ such pulse is gated through AND-gate 48 to the sampler 54.

Referring back to terminal Y, at time $t_{12}$, the voltage at the output terminal L of the summation network 44 is substantially equal to the voltage stored in storage circuit 40. Thus, when pulse 53 is applied to sampler 54 the voltage at terminal L is sampled and stored in the output storage circuit 56 via terminal R. Accordingly, the voltage now stored in storage circuit 56 will be coupled via terminal T and the low pass filter 58 to the terminal Z and utilized to develop the audio intelligence transmitted during the sample period $S_2$–$S_3$.

At time $t_{14}$, the monostable circuit 60, in response to pulse 53, develops the positive EOP pulse 55 and the negative EOP pulse 57 which respectively appear on terminals P+ and P−. The positive EOP pulse 55, as stated earlier, is utilized to reset the bistable circuit 36, bistable circuit 46, positive storage circuit 40, and causes the ramp generator 14 to fall to some negative voltage such as −8 volts in the example shown in FIG. 2. The negative EOP pulse 57 is utilized to discharge both the negative storage circuit 24, and the negative reference storage circuit 26.

At time $S_3$ sample period $S_2$–$S_3$ is completed and the circuit of FIG. 1 is again placed in condition to receive, analyze, compare and decide what voltage information will be coupled to the PPM receiver output circuit during the next sample period $S_3$–$S_4$.

Note here that at time $t_{14}$ the second PPM pulse 13 appears on terminal B, however, since the time occurrence of this pulse is not within the deviation period $D_3$–$D_4$ such pulse is not gated through the AND-gate 12, and accordingly is not processed by the pulse selector of the present invention.

At time $D_5$, the square wave 11 again rises to a positive 8 volts and continues at this voltage level until time $D_6$, thereby again opening the AND-gate 12 and permitting any PPM pulses present on terminal B to be gated through AND-gate 12 to sampler 16. Note here that no pulses appear on terminal B during the deviation period $D_5$–$D_6$. Therefore, storage circuits 24, 26 and 40 will not be charged. Thus, no decision will be made by the pulse selector nor for that matter is it necessary. Although pulses do appear on terminal B at time $t_{15}$ and $t_{18}$, these pulses will not be gated to terminal C since they occur outside of the deviation period $D_5$–$D_6$.

At time $t_{16}$ the monostable circuit 50 again develops a pulse in response to the fall of square wave 11 to zero volts and triggers monostable circuit 52 which in turn again develops a positive pulse. Since no PPM pulses occurred on terminal C, the bistable circuit 46 was not triggered during this third sample period thus no gating voltage will be applied to the AND-gate 48 via terminal M. Accordingly, when pulse 53 is coupled to AND-gate 48 it will not be gated to sampler 54 during this sample period and no voltage change will occur in the output storage circuit 56. Accordingly, the voltage information utilized as the intelligence transmitted during this third sample period will be the same as the voltage information utilized during the second sample period. The control of AND-gate 48 by bistable circuit 46 provides the advantageous feature of utilizing the intelligence coupled to the audio output circuits of the PPM receiver during the immediately previous sample period whenever no PPM pulses, not even interference pulses, occur during the deviation period of any sample period.

At time $t_{17}$ the monostable circuit 60, again in response to the pulse 53, develops both the positive and negative EOP pulses 55 and 57. Since, however, the circuit condition of the circuit elements of the pulse selector were not changed during this third sample period the positive EOP pulse as well as the negative EOP pulse will have no effect upon the circuit elements to which they are coupled, except, of course, the ramp generator 14.

At time $S_4$ sample period $S_3$–$S_4$ is completed and the circuit of FIG. 1 is again placed in condition to receive, analyze, compare and decide what voltage information will be coupled to the PPM receiver output circuit during the next sample period.

Detailed description of several preferred circuits which can be used in the block diagram of FIG. 1 are set forth below.

DETAILED DESCRIPTION, FIGS. 4–12

These figures are included herein to exemplify certain preferred circuits which may be incorporated in the block diagram of FIG. 1. It is to be understood however, that other well-known circuits may also be used in lieu thereof without departing from the spirit and scope of the present invention.

Figure 4:
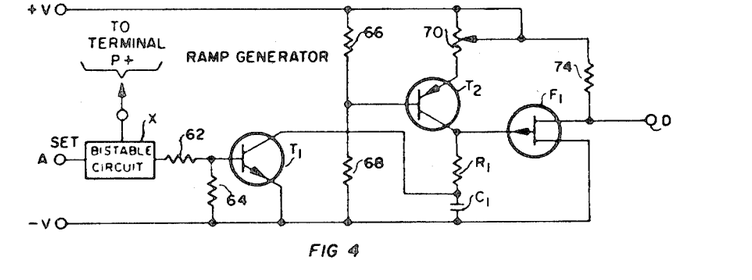
FIGS. 4–12 respectively exemplify a ramp generator, a sampler, a positive storage circuit, a summation network, a positive gate, a negative gate, a negative storage circuit, a negative reference storage circuit, and a comparison circuit each of which may be utilized in the block diagram of FIG. 1.

Referring first to FIG. 4, there is shown an exemplary ramp generator which may be utilized as the ramp generator 14 of FIG. 1. The input and output terminals A and D, respectively, of ramp generator 14 of FIG. 1 are graphically represented in FIG. 4 as terminals A and D also. The description and operation of this circuit is as follows:

Square wave 11, which is developed by the deviation period generator 16, is coupled to the bistable circuit X via terminal A, which causes bistable circuit X to switch to one of its stable states. The output of bistable circuit X is coupled to the base of transistor $T_1$ via resistor 62. When the bistable circuit X is in this first stable state, $T_1$ is driven into nonconduction. When $T_1$ is not conducting such as during time periods $D_1$ to $S_2$, $D_3$ to $S_3$ and $D_5$ to $S_4$, the capacitor $C_1$ charges toward +V voltage via the circuit path including +V source, resistor 70, the collector and emitter of $T_2$, resistor $R_1$, capacitor $C_1$ to −V source. Note here that when the square wave 11 falls to substantially zero volts, such as at time $D_2$ as shown in FIG. 2, neither $T_1$ nor the bistable circuit X are affected and capacitor $C_1$ continues to charge. However, in the example shown in FIG. 2, ramp wave 19, which represents the voltage across capacitor $C_1$, at approximately time $D_2$ reaches substantially +V volts, which may be +8 volts as shown in FIG. 2, and remains at this voltage level until discharged by an EOP pulse. It is important that the output of the ramp generator 14 is held to some positive voltage level until the end of each sample period so that a desired potential will be applied to the comparison circuit 30 via inverter 28, during the time periods it is desired to inhibit AND-gate 32 and prevent any positive PAM pulses, which may appear on terminal F+, to be gated through AND-gate 32 and coupled to the positive storage circuit 40 and OR-gate 42.

The ramp generator 14 is thereafter reset by the positive EOP pulses 55 developed by the monostable circuit 60, which appear on terminal P+, and are coupled to the bistable circuit X via reset terminal P+. Accordingly, at the end of each sample period the ramp generator 14 is reset by the EOP pulses and the bistable circuit X is driven into its original stable state, wherein $T_1$ is driven into conduction. When $T_1$ conducts, capacitor $C_1$ is prevented from charging above −V volts. Thus, when the square wave 11 sets the bistable circuit X, $C_1$ is permitted to charge +V volts, and conversely when the positive EOP pulses reset the bistable circuit X, the $C_1$ discharges through $T_1$ and is prevented from rising above −V volts until such time as $T_1$ is again driven into its nonconducting condition.

A resistor 64 is coupled across the base and emitter electrodes of $T_1$ and conventionally functions as an emitter-base return. $T_2$ in this circuit functions as a constant current source for $C_1$, and thereby permits this capacitor to be charged linearly, such as shown in FIG. 2. The resistors 66 and 68 are connected in a voltage divider arrangement between +V and −V, and provide biasing potentials for the base electrode of $T_2$, whereas resistor 70 functions conventionally as the emitter-base electrode resistor for $T_2$. Resistor 70 may be a potentiometer such as shown in FIG. 4, for providing means for adjusting the slope of ramp wave 19.

The field effect transistor $F_1$ of FIG. 4 has its source electrode connected to terminal D, its drain electrode connected to −V, and its GATE electrode connected to the junction of $R_1$ and the emitter of $T_2$. $F_1$ conventionally functions as a high input impedance coupling element in many respects similar to a conventional vacuum tube cathode follower. Thus, the output of the ramp generator 14, which is developed across resistor 74, will be substantially equal to the charge across the $C_1$. $R_1$ is coupled between $C_1$ and the GATE electrode of $F_1$ to compensate for the inherent potential offset between the gate electrode and source electrode of $F_1$. It will be apparent from the foregoing that whenever $T_1$ is driven into nonconduction, $C_1$ linearly charges and that the voltage on $C_1$ will be coupled to terminal D via $F_1$.

Figure 5:
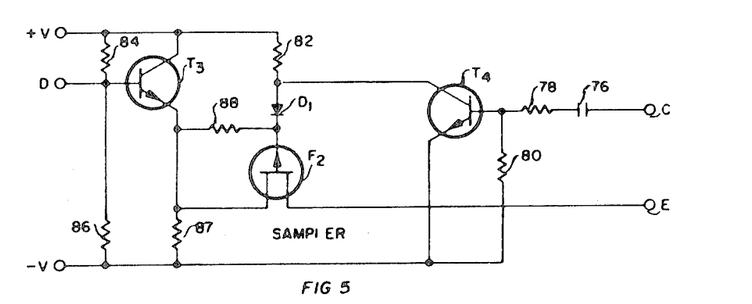

Referring next to FIG. 5, there is shown an exemplary sampler which may be utilized as the sampler 16 or 54 of FIG. 1. The terminals C–D–E of sampler 16 of FIG. 1 are graphically represented in FIG. 5 as terminals C–D–E also. Note that terminals Q–L–R of sampler 54 correspond to terminals C–D–E of FIG. 5. The description and operation of the sampler circuit is as follows:

When a gating pulse, such as pulses 17 of FIG. 2, are present on terminal C of FIG. 5 and coupled via coupling capacitor 76 and limiting resistor 78 to the base electrode of transistor $T_4$, this transistor conducts thereby causing current flow through the current path comprising +V source, resistor 82, the collector-emitter path of $T_4$, to the −V source. Current flow through the resistor 82 causes the voltage at the anode of diode $D_1$ to fall substantially to −V volts and thereby back bias $D_1$. Note that when $D_1$ is forward biased, as in the case when $T_4$ is nonconducting, +V volts is coupled to the gate electrode of $F_2$ via resistor 82 and $D_1$. However, when $D_1$ is back biased the potential at the gate electrode of $F_2$ is at the same potential as the potential at the drain electrode of $F_2$ since resistor 88 is substantially floating. That is to say, since the drain electrode of $F_2$ is directly connected to the emitter of $T_3$, and since the gate electrode is connected to the emitter of $T_3$ via resistor 88, and further since resistor 88 will not draw current when $D_1$ is back biased, the potential at the emitter of $T_3$ will be effectively coupled to both the gate and drain electrodes of $F_2$. As is well known to those skilled in the solid state art, when a field effect transistor has its gate electrode and drain electrode at equal potentials, the field effect transistor becomes ohmic, i.e. it act like a low-value resistor. Thus, whatever voltage is present at the emitter of $T_3$, it will be coupled to the terminal E via the drain and source electrodes of $F_2$ whenever $D_1$ is back biased.

Transistor $T_3$ of FIG. 5 is coupled in a common emitter-follower arrangement and has its base electrode coupled to terminal D via the junction of resistors 84 and 86, which resistors are series connected in a voltage divider arrangement between +V and −V. The collector of $T_3$ is directly coupled to +V for biasing purposes, whereas the emitter of $T_3$ is connected to −V via load resistor 87. Resistor 80 is connected across the base and emitter electrodes of $T_4$ and conventionally functions as an emitter-base return.

It will be apparent from the foregoing that whenever a positive potential of sufficient value, such as 6 volts as in the example of FIGS. 1–3, is present on terminal C, the voltage present on the emitter of $T_3$, which is substantially the voltage applied to terminal D, is coupled to terminal E via $F_2$. Thus, the voltage at terminal D is sampled and coupled to terminal E during the time duration of the voltage at terminal C.

Figure 6:
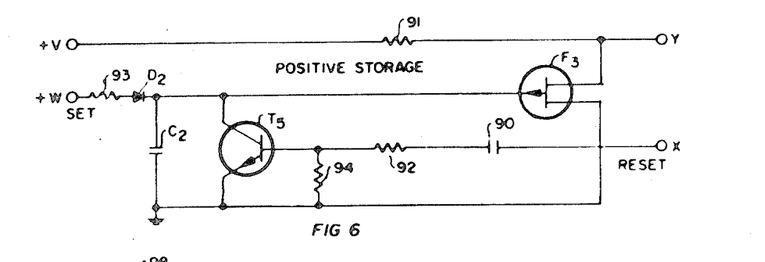

Referring now to FIG. 6 there is shown a storage circuit which may be utilized as the positive storage circuit 40 of FIG. 1. The terminals X–Y–W+ of storage circuit 40 of FIG. 1 are graphically represented as terminals X–Y–W+ of FIG. 6 also. Note here that the storage circuit 40 will be cleared each time a positive PAM pulse appears on terminal W+, or when a positive EOP pulse appears on terminal P+. Both the positive PAM and EOP pulses are coupled to the reset terminal of storage circuit 40 via OR gate 42.

When a pulse is applied to terminal W+, it is stored in capacitor $C_2$ and appears at terminal Y. This is so since the current flow from +V to ground through the source and drain electrodes of field effect transistor $F_3$ is controlled by the potential applied to the gate electrode thereof, which gate electrode is connected to the positive side of $C_2$. $F_3$ has its source electrode connected to the junction of terminal Y and resistor 91, which resistor conventionally functions as the output load for the storage circuit while its drain electrode is directly connected to ground. It will be apparent that by proper selection of the +V source and the load resistor 91, the voltage appearing at Y will be substantially equal to the voltage applied to terminal W+. The field effect transistor $F_3$ is preferred as the coupling element between terminals Y and W+ since it presents a considerably high impedance to the capacitor $C_2$ thereby preventing undesirable leakage of this capacitor.

The storage circuit of FIG. 6 may be "cleared" or discharged by coupling a positive pulse such as the positive PAM pulses or the positive EOP pulses of FIG. 2, to the base electrode of transistor $T_5$ via coupling capacitor 90 and limiting resistor 92, thereby driving transfer $T_5$ into conduction and providing a DC discharge path to ground for capacitor $C_2$ through the collector emitter electrodes of $T_5$. Resistor 94 is coupled between the base and emitter electrodes of $T_5$ and conventionally functions as an emitter-base return for $T_5$. A series connected resistor 93 and diode $D_2$ are connected between terminal W+ and $C_2$ to prevent undesirable leakage of current from $C_2$ to the terminal $W_2$. It will be apparent from the foregoing that the voltage applied to terminal W+ will be stored on capacitor $C_2$, and that a voltage equal to the voltage at terminal W+ will be present on terminal Y until either a positive PAM or EOP pulse appears on terminal X.

Figure 7:
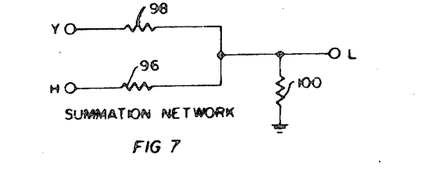

Referring now to FIG. 7 there is shown an exemplary summation network which may be incorporated in the block diagram of FIG. 1. The terminals H–Y–L of the summation network 44 of FIG. 1 are graphically represented in FIG. 7 as terminals H–Y–L also. The description and operation of this circuit is as follows:

When voltages are present one terminal H and Y, such as shown in FIGS. 2 and 3, they are developed across resistors 96–100 or 98–100, respectively, and the approximate algebraic summation of such voltages will be present on terminal L. Although the circuit of FIG. 7 is a summation network, the terminals H and Y thereof will not have voltages present thereon at the same interval of time. Thus, this circuit basically develops across resistor 100 what ever voltage is present at terminal H and Y, and such developed voltages will be present on terminal L. It will be apparent therefore that whatever voltages are present on terminals H or Y, such voltages will also appear at terminal L.

Figure 8:
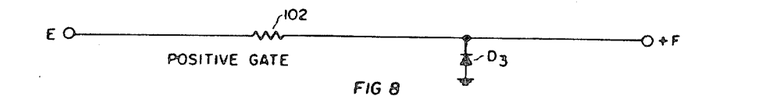
Figure 9:
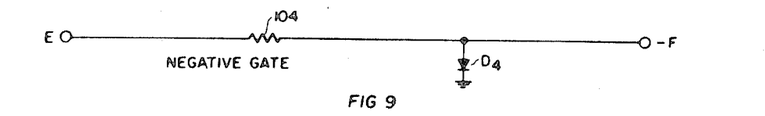

Referring now to FIGS. 8 and 9, wherein exemplary positive and negative gate circuits, respectively, are shown, such circuits may be utilized as the positive and negative gates 18 and 20, respectively of FIG. 1. The terminals E and F+ of the positive gate 18 and the terminal E and F− of the negative gate 20, which are shown in FIG. 1, are correspondingly represented in FIGS. 8 and 9 as terminals E and F+ and E and F−, respectively.

When the PAM pulses, such as pulses 21 to 27 of FIG. 2, are present on terminal E the positive pulses only will pass through the positive gate 18, whereas the negative pulses only will pass through the negative gate 20. The gate circuits of FIGS. 8 and 9 are conventional in that any PAM pulse present on terminal E will be either permitted to pass to terminals F+ or F− or will be shunted to ground depending upon the poling of diodes $D_3$ and $D_4$. That is to say, in the positive gate of FIG.

8, the diode $D_3$ functions as a negative clamp, whereas in the negative gate circuit of FIG. 9, diode $D_4$ functions as a positive clamp. It will be apparent from the foregoing that when a positive pulse appears on terminal E it will be gated through positive gate 18 and coupled to both the AND-gate 32 and the SET terminal of the bistable circuit 36; whereas all negative pulses appearing on terminal E will be gated through the negative gate 20 to the OR-gate 22 and to the SET terminals of both the negative reference storage circuit 26 and the negative storage circuit 24.

Figure 10:
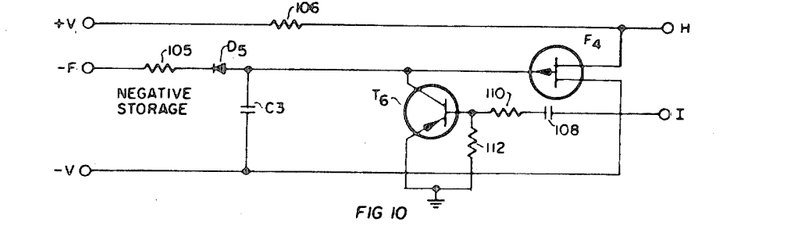

Referring now to FIG. 10, there is shown an exemplary negative storage circuit which may be utilized as the storage circuit 24 of FIG. 1. The terminals H–I–F– of the storage circuit 24 of FIG. 1 are graphically represented in FIG. 10 as terminals H–I–F– also. The description and operation of this circuit is as follows:

Note first that the storage circuit 24 will be cleared each time a negative PAM pulse appears on terminal I and at the end of each sample period when a negative EOP pulse appears on terminal P–. Both the negative PAM pulses and the negative EOP pulses are coupled to the reset terminal of storage circuit 26 via OR-gate 22.

When a pulse appears on terminal F–, it is stored in capacitor $C_3$ and appears at terminal H. As above stated with regard to the storage circuit of FIG. 6, such stored energy will appear at terminal H because of the current flow from +V source through the field effect transistor $F_4$ to the –V source. Note here that this circuit is similar to the storage circuit of FIG. 6 in all respects except the voltage level to which the storage capacitor $C_3$ is permitted to charge. That is to say, in this circuit storage $C_3$ can charge between 0 volts and –V volts; whereas the storage capacitor $C_2$ of the storage circuit of FIG. 6 can charge between 0 volts and +V. Also, in this circuit a PNP transistor is used as T instead of an NPN as in FIG. 6, and the diode $D_6$ is poled opposite to diode $D_6$ of FIG. 6 so that it can process negative PAM pulses. The discharge of the $C_3$ is performed in the same manner as above described with regard to FIG. 6. However, the pulses for discharging $C_3$ is developed by the monostable circuit 60 and corresponds in time to either the leading edge of the negative pulses developed by the inverter 34 or the end of each sample period as the case may be. Such discharge pulses or EOP pulses must be negative going so that it can be coupled through the negative OR-gate 22. It will be apparent to those skilled in the prior art that the monostable circuit 60 can be designed to develop both positive and negative pulses and a description of this circuit is not considered essential in understanding the description of the present invention.

Figure 11:
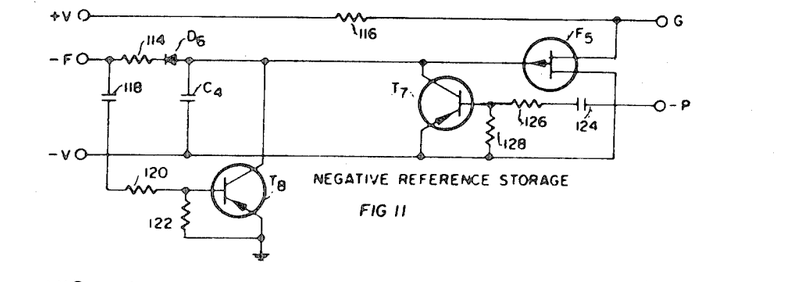

Referring now to FIG. 11, there is shown a negative reference storage circuit which may be utilized as the storage circuit 26 of FIG. 1. Terminals G, F– and P+ of storage circuit 26 of FIG. 1 are graphically represented as terminals G, F– and P+ of FIG. 6 also. Note here that the storage circuit 26 will be cleared at the end of each sample period when a negative EOP pulse appears on terminal P–, which pulses are appropriately coupled to the reset terminal of storage circuit 26.

When the negative PAM pulses appear on terminal F–, capacitor 118 and resistors 120 and 122 differentiate such pulse. That is to say, the waveform applied to the base of transistor $T_8$, for each negative PAM pulse, will have a large negative spike corresponding in time to the leading edge of the negative PAM pulse, and a large positive spike corresponding in time to the trailing edge. The negative spikes drive transistor $T_8$ into conduction and charge the capacitor $C_4$ to ground. Of course the positive spikes will have no effect upon $T_8$ since it will be in a nonconducting condition once the positive spikes fall to approximately zero volts. During the latter portion of the negative PAM pulse, and when $T_8$ is nonconducting, $C_4$ will then be discharged to the voltage level of that particular negative PAM pulse. Thus, $T_8$ establishes a reference from which $C_4$ can be discharged so as to effect a storage condition in which the voltage level of the negative PAM pulse is accurately stored in the negative reference storage circuit 26, i.e. across $C_4$. Resistor 114 is a limiting resistor for coupling the negative PAM pulses to $C_4$ and diode $D_6$ prevents desirable leakage of current from $C_4$ to terminal F–. The voltage stored in $C_4$ will appear at terminal G. As above stated with regard to the storage circuits of FIGS. 6 and 10, such stored energy will appear at terminal G due to current flow from the –V source through the field effect transistor $T_5$ to the –V source. Note here that this circuit is similar to the storage circuit of FIG. 10 in all respects except that the voltage level to which the storage circuit is permitted to charge. That is to say, in this circuit $T_8$ will always charge $C_4$ to zero volts whenever a negative PAM pulse appears on terminal F–. Thereafter, $C_4$ will be discharged to a negative voltage somewhere between zero and –V volts. The charging of $C_4$ is performed in the same manner as above described with regard to FIG. 10. However, it is necessary that $C_4$ be discharged completely to –V volts. Accordingly, when an EOP pulse appears on terminal P–, $C_4$ will discharge through the collector-emitter path of transistor $T_7$, which transistor is appropriately coupled across $C_4$. This is necessary so that the proper comparison of the inverted rampwave 43 and the voltage stored in the negative reference storage circuit 26 can take place. Thereafter, of course, it is necessary that the capacitor $C_4$ be charged to zero volts, to provide the proper storage of the negative PAM pulses. This latter requirement of course is performed by the differentiation circuit and the transistor $T_8$.

Figure 12:
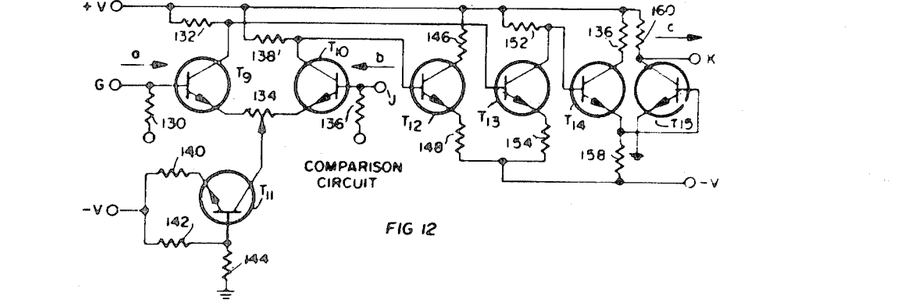

Referring now to FIG. 12 there is shown an exemplary comparison circuit which may be utilized as the comparison circuit 30 of FIG. 1. The terminals G–J–K of the comparison circuit 30 of FIG. 1 are graphically represented in FIG. 12 as terminals G–J–K also.

When the two input voltages are respectively present at terminals G and J, the output of this circuit at terminal K will be substantially the difference between the voltage at J subtracted from the voltage at G. Basically, the transistor $T_9$ operates as an emitter-follower so that the signal at G, which is coupled to the base of $T_9$ and developed across resistor 130, appears at the emitter electrode of $T_9$ and correspondingly appears at the emitter-electrode of transistor $T_{10}$. Thus, when the voltage applied at terminal G appears at the emitter electrode of transistor $T_{10}$, it is the equivalent to the inverse of that voltage being applied to the base of transistor $T_{10}$, so that the collector electrode of $T_{10}$ will effectively produce across its load resistor in analog voltage representing the voltage at J subtracted from the voltage at G. The resistor 132 which is coupled between the +V source and the collector of $T_9$, functions as a load resistor, whereas potentiometer 134 coupled between the emitters of $T_9$ and $T_{10}$ provides means for balancing the circuit. The voltage appearing at terminal J is conventionally coupled to the base electrode of $T_{10}$ and developed across resistor 136. Transistor $T_{11}$ is a conventional constant current source having its collector electrode connected to the slider of potentiometer 134 and its emitter electrode connected to the –V source via resistor 140. The base electrode of $T_{11}$ is connected to ground via resistor 144 while the resistor 142 functions as an emitter-base return. It will be apparent here that when voltages are present at both terminal G and J, that the output voltage developed across resistor 138 and coupled to transistor $T_{12}$ will represent the voltage at terminal J subtracted from the voltage at terminal G, whereas the voltage developed across resistor 132 will represent the voltage at terminal G subtracted from the voltage at terminal G.

The voltages which are developed across the load resistors 132 and 138, are coupled to the base electrode of transistors $T_{13}$ and $T_{12}$, respectively. Transistors $T_{12}$ and $T_{13}$ are conventionally connected in circuit as amplifiers with only the output developed across the load resistor 152 of transistor $T_{13}$ being coupled to transistor $T_{14}$. Transistor $T_{14}$ is conventionally connected in circuit as an emitter-follower with its output being developed across load resistor 158 and being coupled to the base of coupling transistor $T_{15}$. Transistor $T_{15}$ is conventionally coupled in circuit as a grounded emitter amplifier with its output, which is developed across load resistor 160; being coupled to the output terminal K. Note here that transistors $T_{12}$ and $T_{13}$ are biased so that when the voltage (a) exceeds the voltage of (b) the current through resistor 152 will drop below a threshold value thereby causing the voltage at the base electrode of $T_{14}$ to increase. When this increase in voltage at the base electrode of $T_{15}$ occurs, a corresponding increase in voltage at the base electrode of $T_{16}$ occurs thereby increasing current flow through flow through $T_{15}$ and decreasing the voltage present on terminal K.

It will be apparent from the foregoing that the unique arrangement of memory and logic circuits of the present invention, advantageously provide a novel pulse selecting system capable of receiving position-modulated pulses and randomly occurring interference pulses of equal amplitude in spaced time frames, whereby the pulse of a plurality of pulses occurring during any one time frame which is closest to the center of that time frame is selected and utilized as the intelligence pulse. This invention therefore provides a novel technique for reducing the undesirable effects of omissive or commissive errors in a PPM communication system.

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

I claim:

1. A pulse selecting system comprising in combination:
  a. input means for receiving a position modulated pulse train having a series of spaced time frames in which an intelligence pulse may appear, said pulse train being subjected to interference pulses during said time frames;
  b. converting means coupled to said input means for converting the position of all pulses received during the first half of any one time frame into a first train of amplitude modulated pulses of one polarity, and for converting the position of all pulses received during the last half of said one time frame into a second train of amplitude modulated pulses of a polarity opposite to said one polarity;
  c. selecting means coupled to said converting means for selecting from said first and second trains of amplitude modulated pulses during said one time frame the pulse which is closest in amplitude to zero volts; and
  d. output means coupled to said selecting means for producing an output signal representative of the amplitude of said pulse selected during said one time frame.

2. A pulse selecting system comprising, in combination:
  a. input means for receiving position-modulated pulse train having a series of spaced time frames in which an intelligence pulse may appear, said pulse train being subjected to interference pulses during said time frames
  b. conversion means for converting said position-modulated pulse train to an amplitude-modulated pulse train;
  c. first memory means coupled to said conversion means for storing the last amplitude-modulated pulse to occur during the first half of any one time frame;
  d. second memory means coupled to said conversion means for storing the first amplitude-modulated to occur during the second half of said one time frame;
  e. selecting means coupled to said first and second memory means for selecting from said two pulses respectively stored in said first and second memory means, the pulse which is closest to the center of said one time frame; and
  f. output means coupled to said selecting means for producing an output signal representative of the position of said pulse selected during said one time frame.

3. A pulse selecting system comprising, in combination:
  a. input means for receiving a position modulated pulse train having a series of spaced time frames in which an intelligence pulse may appear, said pulse train being subjected to interference pulses during said time frames;
  b. converting means coupled to said input means for converting the position of all pulses received during the first half of any one time frame into a first train amplitude modulated pulses of one polarity, and for converting the position of all pulses received during the last half of said one time frame into a second train of amplitude modulated pulses of a polarity opposite to said one polarity;
  c. first memory means coupled to said input means for storing the last amplitude-modulated pulse to occur during the first half of any one time frame;
  d. second memory means coupled to said input means for storing the first amplitude-modulated pulse to occur during the second half of said one time frame;
  e. selecting means coupled to said first and second memory means for selecting from the two pulses respectively stored in said first and second memory means, the pulse which is closest in amplitude to zero volts; and
  f. output means coupled to said selecting means for producing an output signal representative of the amplitude of said pulse selected during said one time frame.

4. A pulse selecting system comprising, in combination:
  a. input means for receiving a position-modulated pulse train having a series of spaced time frames in which an intelligence pulse may appear, said pulse train being subjected to interference pulses during said time frames;
  b. converting means coupled to said input means for converting the position of all pulses received during the first half of any one time frame into a first train of amplitude-modulated pulses said first train having a last pulse, and for converting the position of all pulses received during the last half of said one time frame into a second train of amplitude-modulated pulses said second train having a first pulse;
  c. first gating means coupled to said converting means for gating only said first train of pulses to a first memory means, whereby said first memory means stores only said last pulse of said first train of pulses;
  d. second gating means coupled to said converting means for gating only said second train of pulses to a third gating means;
  e. comparison means coupled to said memory means for comparing said last pulse with a preselected voltage whereby a control voltage is developed which is proportional to the relative voltage levels of said last pulse and said preselected voltage;
  f. said control voltage being capable during the last half of said one time frame of opening said third gating means when said first pulse of said train of pulses is closer to the center of said one time frame than said last pulse for coupling only the first pulse of said second train of pulses to a second memory means, and capable of closing said gating means when said last pulse is closer to the center of said one time frame than said first pulse for preventing any of said second train of pulses from being stored in said second memory means;
  g. discharging means coupled to said third gating means for discharging said first memory means only when said third gating means is opened by said control voltage; and
  h. output means coupled to said first and second memory means for producing an output signal representative of the voltage stored in said first and second memory means at the end of said one time frame, thereby utilizing as the intelligence pulse transmitted, the pulse occurring during said one time frame which is closest to the center of said one time frame than any other occurring pulse.

5. A pulse selecting system comprising, in combination:
  a. an input circuit for receiving a position-modulated pulse train having a series of spaced time frames in which an intelligence pulse may appear, said pulse train being subjected to interference pulses during said time frames;
  b. a demodulating circuit coupled to said input circuit for converting the position of all pulses received during the first half of any one time frame into a first train of amplitude modulated pulses of one polarity, said first train having a last occurring pulse, and for converting the position of all pulses received during the last half of said one time frame into a second train of amplitude pulses of a polarity opposite to said one polarity, said second train having a first occurring pulse, c. a first gate coupled to said demodulating circuit for gating only said first train of pulses to a first storage circuit;

d. said first storage circuit being adapted to store only said last-occurring pulse of said first train of pulses;

e. a second gate coupled to said demodulating circuit for gating only said second train of pulses to a third gate;

f. said third gate being adapted to gate only said first-occurring pulse of said second train of pulses;

g. a comparison circuit coupled to said first storage circuit for comparing said last pulse with a preselected voltage, and for developing a control voltage proportional to the relative voltage levels of said last pulse and said preselected voltage;

h. said control voltage being capable during the last half of said one time frame of opening said third gate when said first pulse is closer to zero volts than said last pulse for coupling only said first pulse of said second train of pulses to a second storage circuit for storage therein, and capable of closing said third gate when said last pulse is closer to zero volts than said first pulse for preventing any of said second train of pulses from being stored in said second storage circuit;

i. discharging means coupled to said third gate and said first storage circuit for discharging said first storage circuit only when said first pulse is closer to zero volts than said last pulse; and j. an output circuit coupled to said first and second storage circuit for producing an output signal representative of the voltages stored in said first and second storage circuits at the end of said one time frame, thereby utilizing as the intelligence pulse transmitted, the pulse occurring during said one time frame which has a voltage level closest to zero volts than any other occurring pulse.

* * * * *